United States Patent

[11] 3,530,833

| [72] | Inventors | Dee Dexter Allen<br>Zeeland;<br>William R. Comber, Holland, Michigan |
|---|---|---|
| [21] | Appl. No. | 702,300 |
| [22] | Filed | Feb. 1, 1968 |
| [45] | Patented | Sept. 29, 1970 |
| [73] | Assignee | By mesne assignments, to<br>U.S. Industries, Inc<br>New York, New York<br>a corporation of Delaware |

[54] ANIMAL FEEDER WITH SAFETY SHUT-OFF
10 Claims, 3 Drawing Figs.
[52] U.S. Cl.................................................. 119/51
[51] Int. Cl................................................... A01k 5/00
[50] Field of Search........................................ 119/51, 52,
53; 340/419; 200/61.19, 61.93, 161, 51.09

[56] References Cited
UNITED STATES PATENTS
3,033,163 5/1962 Hostetler et al. ............. 119/52

3,168,888 2/1965 Brodrick ...................... 119/51
3,270,267 8/1966 Nolte........................ 200/51.09X Primary Examiner—Hugh R. Chamblee
Attorney—Price, Heneveld, Huizenga and Cooper ABSTRACT: An animal feeder of the type having a hopper and a long feeder trough communicating with the bottom thereof which houses a driven conveyor member, for example an auger, whose purpose is to transfer feed along the length of the trough, in which the trough is made in separate pieces or segments joined together at connection joints and in which an electrical plug and receptacle are each connected to one side of such a joint in the feeder trough. The plug and receptacle form a series switch in the energizing circuit for the motor which drives the auger or other conveyor member, such that if, upon mechanical malfunction or other difficulty such as binding or jamming of the auger, the feeder trough is separated at such joint, the aforesaid plug will be pulled from the receptacle to open said switch and de-energize the auger drive motor, thereby stopping operation of the feeder.

Patented Sept. 29, 1970

3,530,833

INVENTORS
DEE DEXTER ALLEN
WILLIAM R. COMBER
BY
*Price Heneveld*
*Huizenga & Cooper*
ATTORNEYS

3,530,833

ANIMAL FEEDER WITH SAFETY SHUT-OFF

BACKGROUND

Automated feeding systems for poultry and the like have long been in use, and at least two basic types of such feeders are now well known in the art. These two types include those utilizing an endless chain as a feed-carrying conveyor member, as well as those which utilize an auger as the conveyor member, most typically, an open-centered spring-like helical structure.

In auger-type feeders, a tube which encloses the auger extends from a supply hopper outwardly a desired distance, and the drive motor for the auger can be placed at either the hopper end of the auger tube, in close proximity to the supply of feed to be transferred along the length of the tube, or the end thereof opposite from the hopper, at a considerable distance from the supply of feed. In the first such case, the auger is normally thought of as operating in a "pushing" configuration, whereas in the second such case the auger is normally thought of as operating in a "pulling" configuration, for reasons which are quite understandable. While there is always some prospect of binding and even jamming of the conveyor member in any automated feeder, this prospect is much more real in auger-type feeders, since the spring-like helical augers turn within a fairly close-fitting auger tube and often have quite extended lengths. Thus, since they are driven from one end only, a considerable amount of torsional stress is applied to the spring-like augers along their length, resulting in a considerable amount of winding effect upon them. With the auger operated in a pulling configuration, this winding effect produces a tension in the auger and an equal compressing force at the joints of the tubular housing. When operated in a pushing configuration, however, the winding effect tends to tighten or compress the auger coils, with resulting tension forces applied to the tube.

For the foregoing reason, there is always a danger, particularly in a push-type auger, that the auger tube may be pushed apart at any joint or junction along its length where a pair of tube segments or sections are joined together. Whenever this happens it is a disasterous event, since the drive motor will normally continue to operate, thereby continuing to turn the auger and steadily pushing increasing amounts of feed out of the hopper and outwardly from the opened auger tube, thereby wasting all such feed. Moreover, when the circumstances are such that the auger tube is separated in the foregoing manner, there is at least some likelihood that the auger itself may suffer damage by continued operation of its drive motor. Nonetheless, the prospects of damaging the auger are considerably less under this situation than would be true if the auger tube was a single integral member or, if made of more than one piece, all of the joints between various segments thereof were rigidly secured together so that they could not possibly be separated by the force of the auger. In the latter instance, binding or jamming of the auger is virtually certain to severely damage or break the auger, since the auger tube cannot separate to relieve any of the forces being generated. Consequently, an auger tube with at least one telescoping or other type of separable joint is generally to be preferred in such systems, even though this does make possible the loss of considerable feed upon the occurrence of any operational difficulties of the aforementioned character.

SUMMARY OF INVENTION

Accordingly, the present invention provides an automated feeder system of the auger type which has at least one separable joint in the auger tube and which incorporates a novel safety shut-off means, by which the auger drive motor is de-energized and shut down in the event of any separations in the auger tube. From the foregoing, it will be seen that this system has particularly great advantage when used in push-type configuration auger systems; however, in the broad connotations of the invention the system may readily be used to advantage in practically any automated, conveyor-type feeder system.

Briefly stated, the safety shut-off means of the invention comprises a pair of electrical contacts forming a series switch in the energizing circuitry for the auger drive motor, with one such contact fixedly secured with respect to a first auger tube section and the other such contact fixedly secured with respect to another auger tube section joined to the first such section at a point along the length of the feeder tube or trough. In accordance with this system, forced separation of such joint in the auger tube moves the two electrical contacts apart, thereby opening the energizing circuit to the auger drive motor and de-energizing the latter.

DRAWINGS

PREFERRED EMBODIMENT

Figure 1:
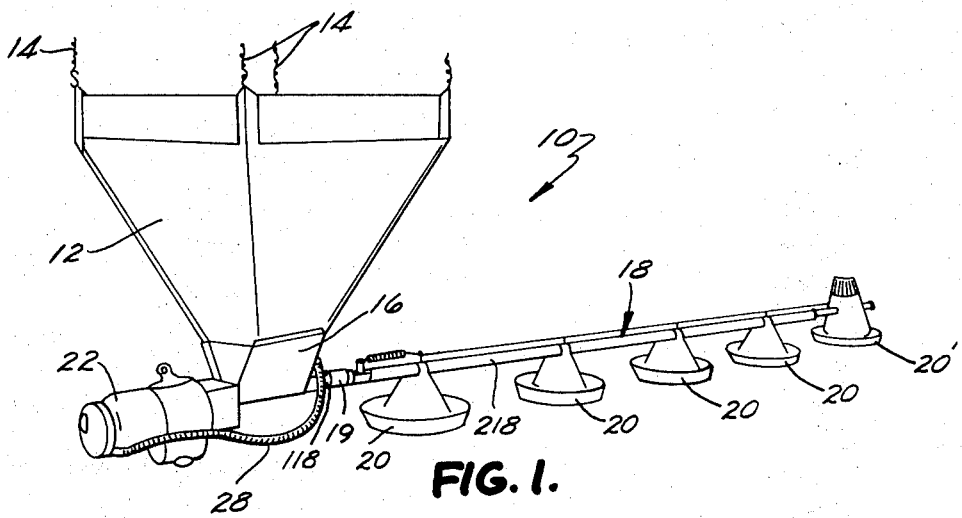
FIG. 1 is a fragmentary frontal perspective view of a feeder system in accordance with the present invention.

Referring more specifically to the drawings, the feeder system 10 illustrated in FIG. 1 will be seen to include a hopper 12 which is preferably suspended from overhead by chains 14 or the like, and in which a desired quantity of bulk feed may be stored for use. The hopper 12 is of a known design, including downwardly-convergent sides terminating in a V-shaped boot portion 16 at its bottom extremity. A feeder trough in the form of an auger tube 18 extends laterally outward from the boot portion 16 of the hopper and communicates therewith, to receive feed from the hopper. As will be understood, the auger tube 18 has a hollow interior and encloses an open-center auger of the type mentioned above, the purpose of which is to move feed throughout the length of the tube 18, from which such feed will drop downwardly into each of a series of feeder pans 20, through openings in the bottom of the auger tube, in a manner generally well understood. The last such feeder pan 20', located furthest from the hopper 12, is typically a control device, incorporating a means for sensing the level of the feed supply thereto and for interrupting the operation of the auger when a predetermined quantity of such feed is attained. The feeder system 10 is of the aforementioned push-type configuration, in which the auger drive motor 22 is located close to the hopper 12, on the opposite side of the boot portion 16 thereof from which the auger tube 18 extends outwardly.

Figure 2:
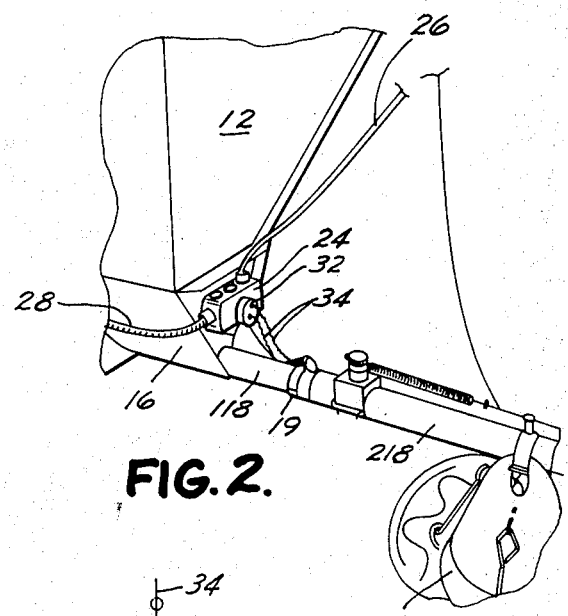
FIG. 2 is an enlarged perspective view showing the outward appearance and location of the safety shut-off for the present feeder system.

The auger tube 18 is made up of at least two tubular sections designated 118 and 218 which are coupled together at a slip joint 19 located near the hopper 12. The first such section 118 (FIG. 2) is preferably fixedly secured to the boot 16 near its bottom extremity, in registration with an opening at the bottom of one of the V-shaped walls defining an end of the boot, such that tubular section 118 is disposed parallel to the bottom of the boot portion 16. The bottom of the V-shaped boot is normally somewhat rounded, in accordance with the diameter of the auger, which extends across the bottom of the boot to the drive motor and gearbox 22 located on the opposite side of the boot from the auger tube. The arrangement of the auger tube section 118 with respect to the boot 16 is thus such that this part of the auger tube in effect forms an outward extension of the boot bottom and, being rigidly secured to the boot, will rigidly support the hopper end of the remainder of the auger tube. Auger tube segment 218 is telescoped over segment 118 at least a brief distance and the two are clamped together at joint 19. Alternatively, the two tube segments may be butted together and joined by a coupling of a desired nature, but in any event the two tubes have a joint which will separate under a predetermined degree of axial force.

Figure 3:
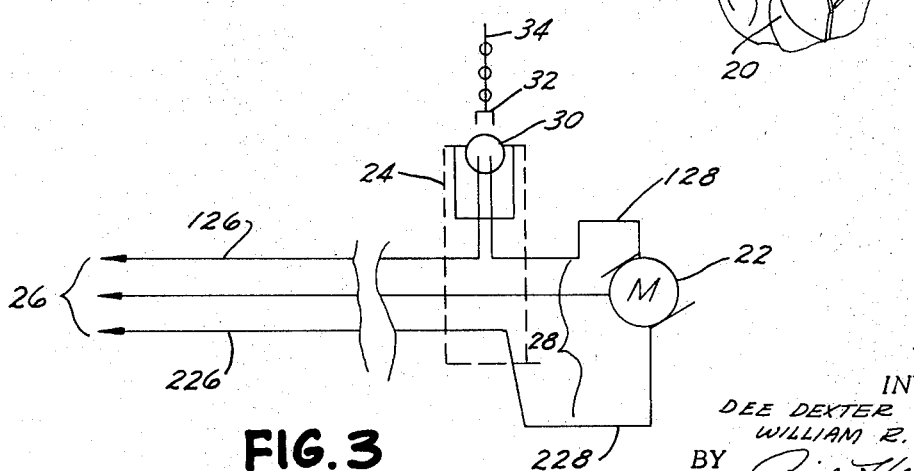
FIG. 3 is a schematic circuit diagram showing the electrical connections for the safety shut-off.

Mounted on the boot portion 16 of the hopper 12 is an electrical junction box 24 (FIG. 2), into which electrical line power is supplied, as by a cable 26, and out of which power is fed, as by a cable 28, to the auger drive motor 22. The junction box 24 forms a housing for and mounts a first electrical contact in the form of a receptacle 30 (FIG. 3). Inserted into this receptacle is a plug member 32 having a U-shaped conductive element or contact, for connecting the two conductors leading into the receptable 30. As will be seen, such two conductors form a series conductance path from cable 26, connected to line voltage, to cable 28, by which operating voltage is supplied to the auger drive motor 22. More specifically, one side of the line voltage is carried by a lead 126 in cable 26 to one side of the electrical contacts in receptacle 30, and the other such contact is connected by a conductor 128, forming a part of cable 28, to the input side of the auger motor 22. The power return or negative-polarity side of the motor is returned to the line source through conductors 228 and 226, which directly interconnect within the junction box 24. As will be understood, while the cables 26 and 28 are shown as including a third conductor providing a ground for the motor 22, this is for compliance with certain electrical codes and is not a distinguishing feature.

In accordance with the foregoing, it will be seen that when the plug member 32 is inserted into the receptacle 30, it will directly connect the two leads 126 and 128 which supply power to the motor 22. On the other hand, when the plug member 32 is pulled out of contact with receptacle 30, the energizing circuit to the motor 22 will be opened, and the motor thereby de-energized. It is for this reason that the junction box 24 and the receptacle 30 carried thereby are secured to the hopper 12, at the boot portion 16 thereof, and thereby fixed with respect to auger tube segment 218. Plug member 32, on the other hand, is attached to auger tube segment 218. This physical interconnection of the plug 32 with the auger tube portion 218 is accomplished through a flexible linkage 34 such as a light-gauge chain or cable. Although flexible, this linkage should, of course, be resistant to tension forces and not subject to stretching under at least moderate loading, since the intended function of this linkage is to pull the plug member 32 out of the receptacle 30 upon a predetermined degree of separation at slip joint 19 between the auger tube segments 118 and 218. As will be apparent, upon such disengagement of the plug 32 from the receptacle 30, the auger drive motor will be de-energized and the auger thus disabled.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended hereinbelow, unless these claims by their language specifically state otherwise.

We claim:

1. An animal feeder construction with safety shut off means, comprising in combination: hopper means for containing a desired quantity of animal feed; an elongated feeder trough means having a lengthwise internal opening located in flow communication with said hopper means, to receive feed therefrom; a movable conveyor member located within said feeder trough internal opening, for moving feed along the length thereof; drive means coupled to said conveyor member to impart movement thereto; said drive means including an electric motor and energizing circuitry connected thereto; said feeder trough means including at least a pair of trough-forming sections coupled together to form a joint which is openable by relative separating movement of said trough-forming sections; and a safety shut-off means forming a switch electrically coupled into said energizing circuitry; said safety shut-off means including a first switch portion and means for mounting the same in a generally fixed position with respect to at least one of said trough-forming sections and a second switch portion and means for mounting the same for no more than limited movement with respect to the other such section; said mounting means for said switch portions positioning the same such that they may be placed in mutual contact when said joint is intact, to close said switch, and such that said switch portions will be moved apart by such relative separating movement of said trough sections tending to open said joint, to thereby open said switch and deenergize said motor.

2. The animal feeder construction of claim 1, wherein said first and second switch portions comprise a plug and receptacle assembly.

3. The animal feeder construction of claim 1, wherein said feeder trough comprises an auger tube, said trough-forming sections comprising individual auger tube portions, and said joint comprising a junction of such auger tube portions.

4. The animal feeder construction of claim 3, wherein said junction comprises a telescoping interconnection of such tube portions.

5. The animal feeder construction of claim 3, wherein said conveyor member is an auger and wherein said electric motor is located on the hopper means end of said feeder trough auger tube, such that said auger is operated in pushing configuration.

6. The animal feeder construction of claim 5, wherein said junction comprises a telescoping interconnection of such tube portions.

7. The animal feeder construction of claim 6, wherein said first and second switch portions comprise a plug and socket assembly.

8. The animal feeder construction of claim 7, wherein one of said auger tube portions is fixed secured to said hopper means near the bottom and comprises a laterally-extending tubular outlet conduit of the latter.

9. The animal feeder construction of claim 8, wherein said socket is secured to one of said hopper means or said one auger tube portion, and wherein said plug is attached to the other of said auger tube portions by a linkage having a fixed length.

10. The animal feeder construction of claim 9, wherein said linkage comprises a flexible but substantially unstretchable member.